May 12, 1970     E. SCHLITZ     3,511,346
BRAKE-ACTUATION DEVICE
Filed Sept. 6, 1968
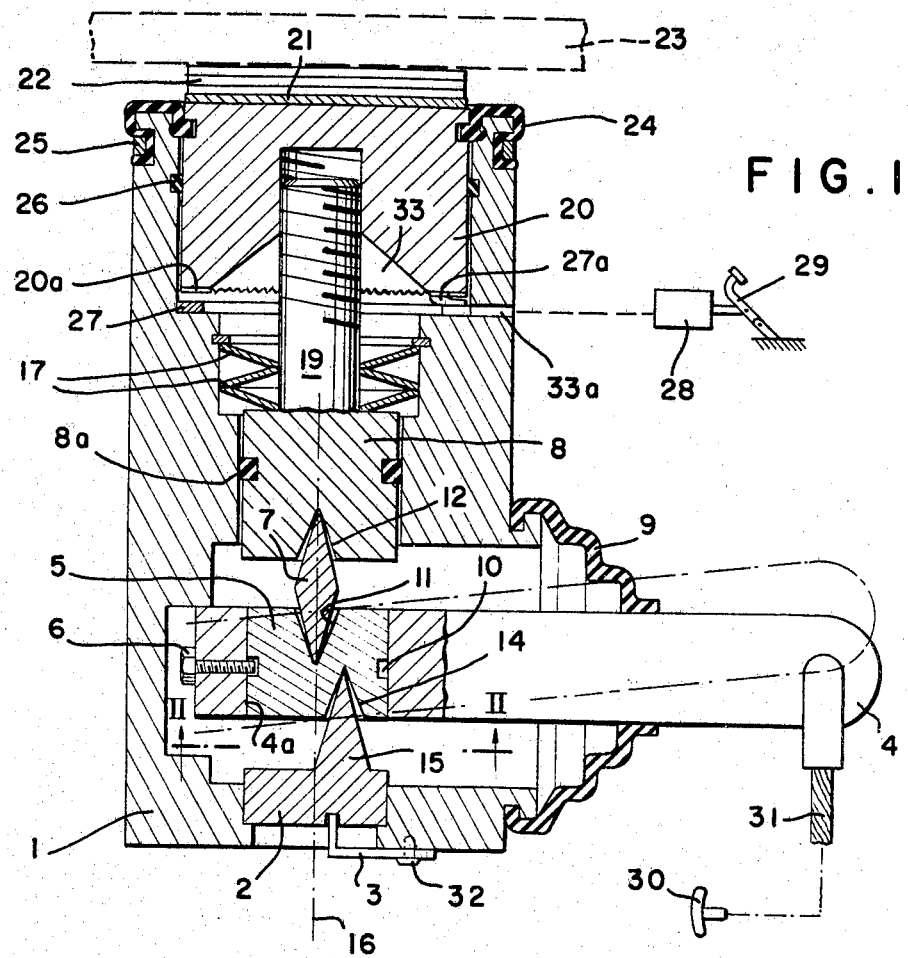
FIG.1
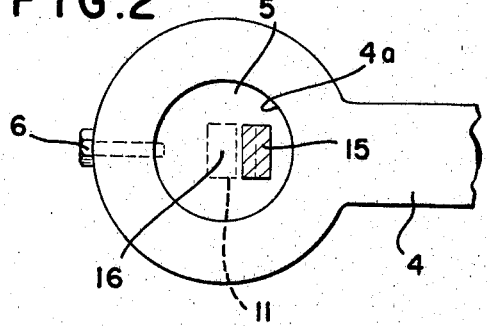
FIG.2
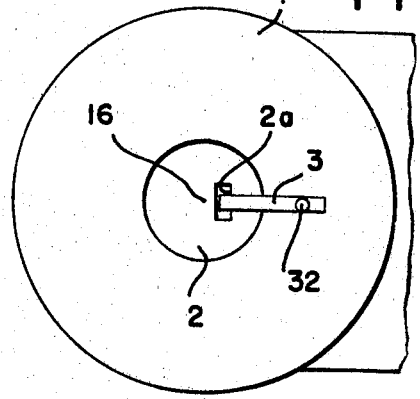
FIG.3
FIG.4
INVENTOR.
ERWIN SCHLITZ
BY
Karl F. Ross
ATTORNEY ём
United States Patent Office 3,511,346
Patented May 12, 1970

3,511,346
BRAKE-ACTUATION DEVICE
Erwin Schlitz, Heusentamm, Germany, assignor to Alfred Teves, G.m.b.H., Frankfurt am Main, Germany, a corporation of Germany
Filed Sept. 6, 1968, Ser. No. 758,042
Claims priority, application Germany, Sept. 18, 1967, T 34,809
Int. Cl. F16d 55/22
U.S. Cl. 188—71.9
10 Claims

ABSTRACT OF THE DISCLOSURE

A brake-actuating device for a brake equipped with a self-adjusting mechanism has a rotatable body mounted in an end of a hand-actuated brake lever. This body is coupled to the back of the adjustment mechanism so that actuation of the the lever moves the body and actuates the brake. The other side of the body is engaged by a fulcrum plug which can be rotated, thereby entraining the rotatable body and the adjustment mechanism to reset the brake.

---

My invention relates to a brake-actuating device for a brake equipped with a self-adjusting mechanism, in particular to mechanically actuatable brakes having an adjustment mechanism wherein a first member is threadedly engaged with a second member such that displacement beyond a certain predetermined distance rotates one or both of these members, thereby adjusting the brake.

Such brakes present a major difficulty in that it is hard to reset the brake when new brakeshoes are inserted. Generally speaking, either the piston or the adjustment shaft, more often the latter, must be rotated to reset the brake. This is often extremely difficult due to the inaccessibility of these parts.

It is therefore an object of my invention to provide a brake-actuating device that permits of a simple and easy resetting of the adjustment mechanism.

A further object is to provide such a device wherein a sure and positive power transmission is assured for mechanical actuation of the brake.

My invention attains these objects, according to a feature of my invention, by providing a rotatable body in the end of the lever actuated for mechanical braking. This body is formed with two wedge-shaped sockets on its opposite faces. The male-threaded member of the adjustment mechanism is formed with a socket corresponding to one of these wedge-shaped sockets and a rhombohedron of metal is snugly received in the two corresponding sockets. In this manner force is accurately transmitted between the lever and the adjustment shaft while a slight amount of canting of the one in relation to the other is possible. On the other side of the body from the shaft is a rotatable fulcrum plug which has a wedge-shaped pivot point which fits into the other of the sockets on the rotatable body. A spring clip or similar means prevents this fulcrum plug from rotating under normal conditions. Since the two sockets on the rotatable cylindrical body mounted in the end of the lever are not aligned, actuation of the lever forces them apart, thus actuating the brake. Reasonably close spacing of the two sockets, one on the shaft axis and the other slighly removed from it, makes for a great mechanical advantage. By the same token, rotation of the fulcrum plug will rotate the adjustment member, thereby resetting the brake.

To make the body rotatable in the end of the lever, according to one feature of my invention, this body is cylindrical and provided with a circumferential groove. The lever is provided with a similarly shaped bore and a screw engaging therein. Thus, placement of the cylinder in the bore and engagement of the screw in the groove permits of rotation of the body while not allowing it to slip out of the bore. According to another feature, the bore can also be provided with a circumferential groove, and a ring is fitted in the two grooves to hold it in place with freedom of rotation.

The above and other objects, features and advantages will be more readily apparent from the following description, reference being made to the accompanying drawing in which:

FIG. 1 is a sectional view of a brake equipped with the device according to my invention;
FIG. 2 is a detail view taken along the line II—II of FIG. 1 with some parts omitted for clarity;
FIG. 3 is a bottom view of the brake of FIG. 1; and
FIG. 4 is a second embodiment of a detail of FIG. 1.

As best seen in FIG. 1, a piston 20 is slidable in a housing 1. A cuff 24 held in place by a ring 25 seals the piston 20 from the outside while a seal 26 seals it internally. The piston 20 forces a brake lining 22 mounted on a backing plate 21 against a brake disk or drum 23. Hydraulic pressure from a master cylinder 28 actuated by a brake pedal 29 flows through a conduit 33a into an open area 33 behind the piston 20 to actuate it.

The piston 20 is associated with a self-adjusting mechanism having a member 8 with a threaded shaft 19 screwed into the back of the piston 20. The member 8 is sealed by a ring 8a and forced downward by three Belleville washers 17 held in place by a snap ring 18. The back of the piston 20 is formed with tiny teeth 20a of sawtooth shape which cooperate with a finger 27a on a washer 27 to allow the piston 20 to turn in only one direction. If the piston 20 is moved beyond a predetermined limit, the Belleville washers 17 force the member 8 away from the piston 20, which makes the piston 20 turn in relation to the nonrotatable shaft 19, thereby adjusting the brake.

A lever 4 actuatable by a handle 30 connected to it via a cable 31 is pivotal in the lower region of the housing 1, behind the member 8 and sealed by a boot 9. As also seen in FIG. 2, a cylindrical body 5 is mounted in bore 4a at the end of this lever 4. This body 5 is formed with a circumferential groove 10 in which a screw 6 engages to allow rotation of the body 5 without letting it slip out of the bore 4a in the lever 4. The upper face of this body 5 is formed with a wedge-shaped socket 11 and the lower end of the member 8 is formed with a similar socket 12, both sockets 11 and 12 lying—as shown in FIG. 1—on an adjustment axis 16 of the member 8. A small rhombohedron 7 of metal fits between these two sockets 11 and 12 to allow canting of the body 5 in relation to the member 8.

As also shown in FIG. 3, a fulcrum plug 2 formed with a wedge-shaped pivot point 15 is located below the body 5, rotatable about the axis 16. The body 5 is further formed with a socket 14 offset from the axis 16 in which this point 15 engages. The plug 2 is held by a spring clip 3 held in turn by a rivet 32; clip 3 engages in an off-center slot 2a of the plug 2 to index the latter in its working position. Other index markings may of course also be used.

FIG. 4 shows a further embodiment wherein a lever 4' is formed with a circumferential groove 4b in a bore 4c. This groove 4b receives, with the groove 10 of the body 5, a ring 34 locking the two together.

As can be seen, movement of the lever 4 between the nonbraking position shown in FIG. 1 by a dot-dash line and the braking position shown by solid lines, moves the member 8 away from the plug 2, thus applying the brakes with a sizable mechanical advantage.

Should the braking lining 22 need replacing, one need only disengage the clip 3 from the slots 2a and turn the plug 2 with, for example, a screwdriver, thus entraining the body 5 and the member 8 to reset the adjustment mechanism. The off-center placing of the slot 2a only allows the clip 3 to engage therein when the fulcrum point 15 is properly set for braking action.

I claim:
1. In a brake having a housing and equipped with a self-adjusting mechanism wherein a first member is threadedly engaged by a second member and is rotatable relative thereto about an adjustment axis on displacement of a brakeshoe relative to the housing to increase the effective combined length of said members and establish a new rest position of the brakeshoe, the improvement comprising:
   an actuating lever pivotal relatively to said housing;
   fulcrum means forming a tilting axis transverse to said adjustment axis and offset therefrom;
   a body rotatable about said adjustment axis and mounted on said lever and a link element operatively engaging one of said members and linking said one of said members and said body for joint rotation along said adjustment axis whereby tilting displacement of said lever under mechanical actuation displaces said members for braking action of said brakeshoe; and
   adjustment means effective from the exterior of said housing adapted to rotate said body and said one of said members for altering said effective length.

2. In a brake having a housing and equipped with a self-adjusting mechanism wherein a first member is threadedly engaged by a second member and is rotatable relative thereto about an adjustment axis on displacement of a brakeshoe relative to the housing to increase the effective combined length of said members and establish a new rest position of the brakeshoe, the improvement comprising:
   an actuating lever pivotal relatively to said housing;
   a body rotatable about said axis and mounted on said lever and operatively engaging one of said members whereby tilting displacement of said lever under mechanical actuation displaces said members for braking action of said brakeshoe;
   adjustment means adapted to rotate said body and said one of said members for altering said effective length, said second member being nonrotatable during increase of said effective length;
   means coupling said body with said second member for joint rotation; and a fulcrum plug generally rotatable about said axis and mounted in said housing, said plug being formed with a fulcrum engaging said body for joint rotation of said plug and said body to alter said effective length, said lever being pivotal on said fulcrum.

3. The improvement described in claim 2, further comprising locking means for releasably arresting said plug in relation to said housing.

4. The improvement described in claim 3 wherein said plug is formed with an off-center slot, said locking means including a spring fixed on said housing and releasably engageable in said slot.

5. The improvement described in claim 2 wherein said body is further formed with a first axially open wedge-shaped socket, said fulcrum being wedge-shaped and received in said first socket.

6. The improvement described in claim 5, further comprising a third member of generally rhombohedral configuration, said second member and said body being formed with corresponding axially open mutually facing second and third wedge-shaped sockets respectively, said third member being received in said second and third sockets, thereby coupling said second member with said body.

7. The improvement described in claim 6 wherein said second and third sockets are aligned with said axis and said first socket is offset from said axis, thereby creating lever action between said first and third sockets.

8. The improvement described in claim 2 wherein said body is substantially cylindrical and said lever is formed with a corresponding substantially cylindrical bore adjacent one end thereof, said body being rotatably received in said bore.

9. The improvement described in claim 8 wherein said body is formed with a circumferential groove, said improvement further comprising a screw mounted in said lever and engageable in said groove.

10. The improvement described in claim 8 wherein said cylindrical body is formed with a circumferential groove, said bore also being formed with a corresponding circumferential groove, said improvement further comprising a ring received in said circumferential grooves retaining said body rotatably in said bore of said lever.

References Cited

UNITED STATES PATENTS

| 2,966,964 | 1/1961 | Brueder | 188—73 |
| 3,392,806 | 7/1968 | Knapp. | |

FOREIGN PATENTS

| 1,043,093 | 9/1966 | Great Britain. |

GEORGE E. A. HALVOSA, Primary Examiner

U.S. Cl. X.R.
188—106, 196